March 19, 1940.  O. F. JAGER  2,194,087
HITCH
Filed Dec. 12, 1938  2 Sheets-Sheet 1
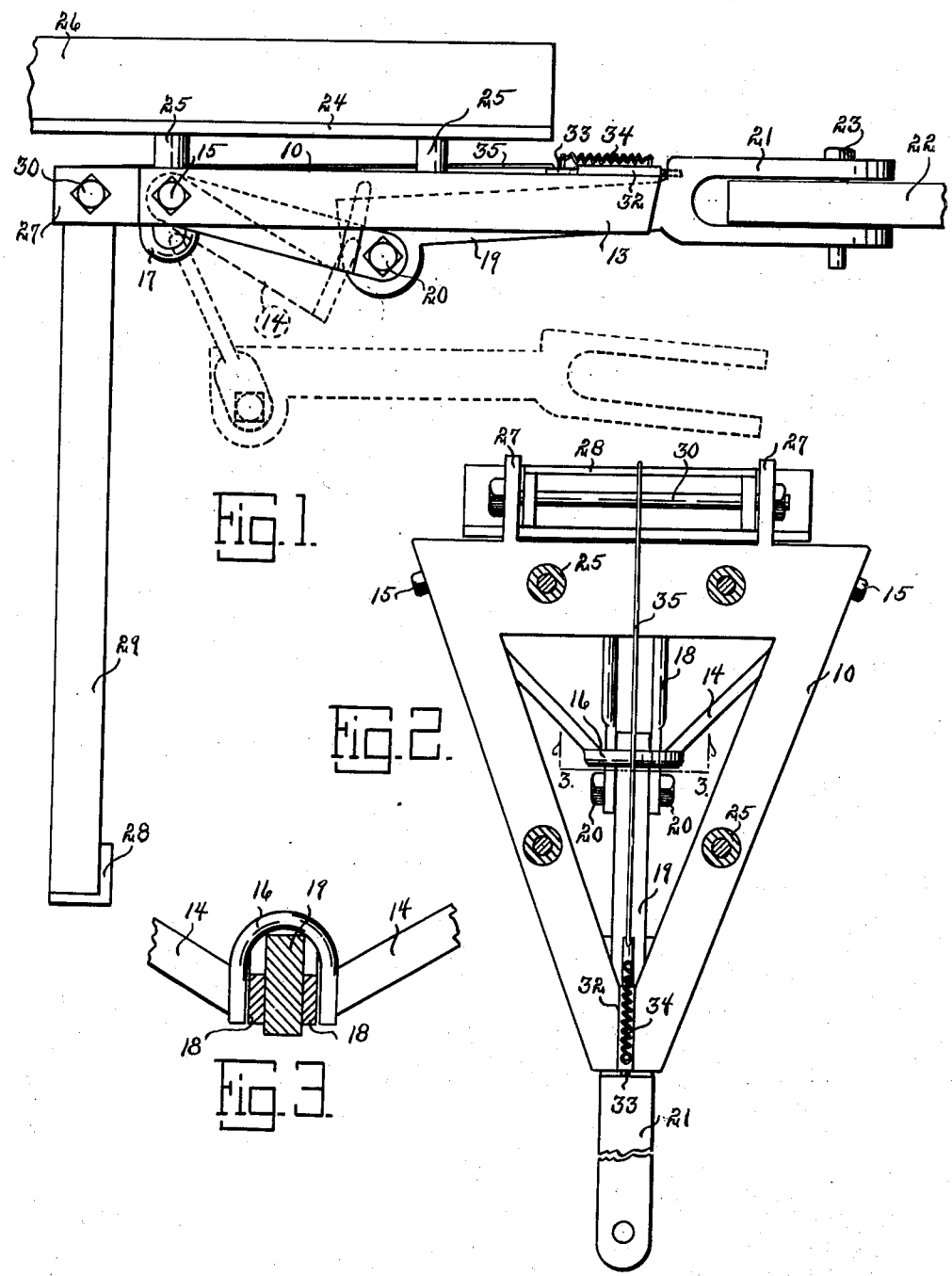
INVENTOR.
O. F. JAGER
BY M. Talbert Dick
ATTORNEY.

March 19, 1940.   O. F. JAGER   2,194,087
HITCH
Filed Dec. 12, 1938   2 Sheets-Sheet 2
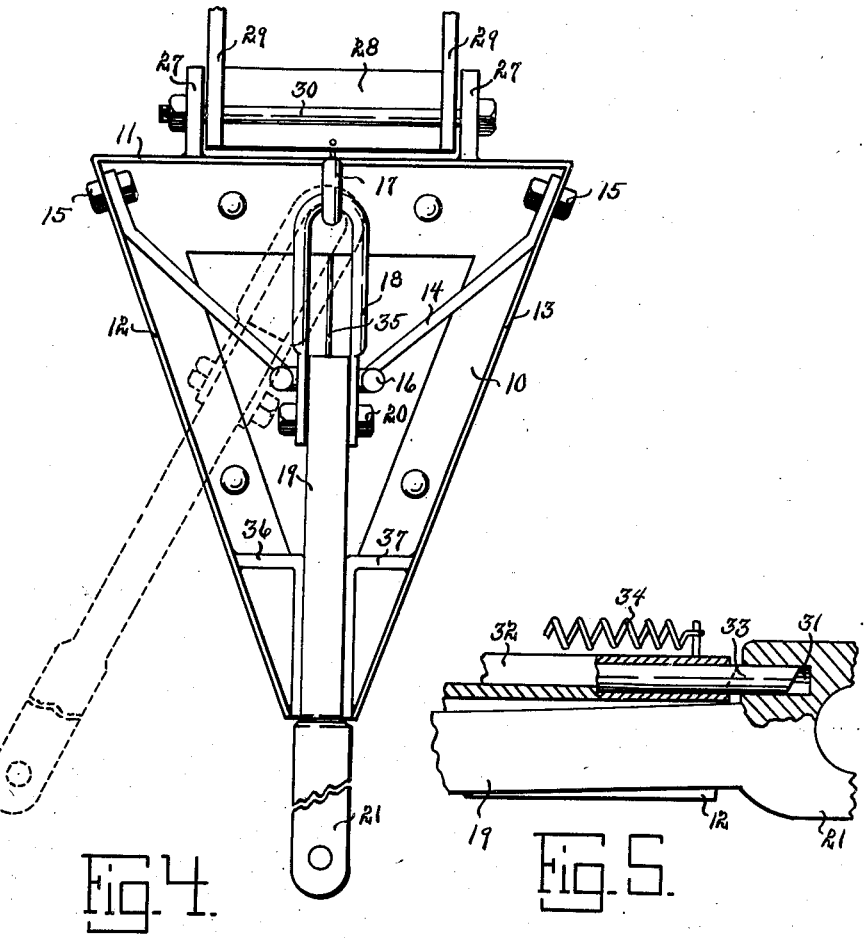
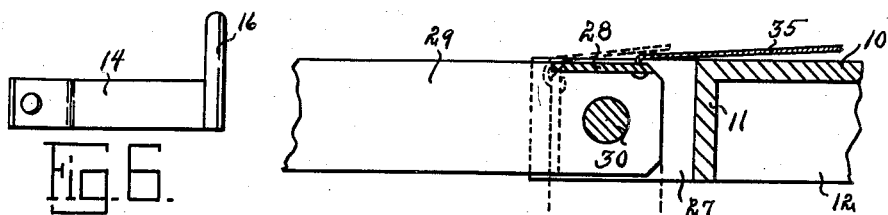
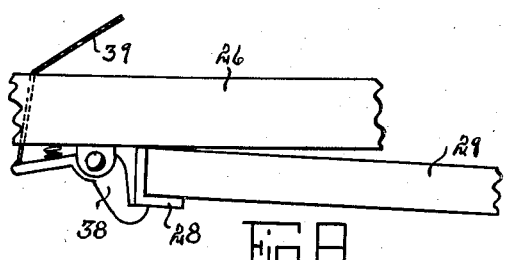
INVENTOR.
O. F. JAGER
BY M. Talbert Dick
ATTORNEY.

Patented Mar. 19, 1940

2,194,087

UNITED STATES PATENT OFFICE 2,194,087

HITCH

Otto F. Jager, Hartley, Iowa

Application December 12, 1938, Serial No. 245,189

5 Claims. (Cl. 280—33.44)

The principal object of my invention is to provide a hitch that is highly flexible in all directions at the time of connecting two vehicles together or at the time of disconnecting the two vehicles from each other.

A further object of my invention is to provide an easily operated hitch particularly designed for use with tractors and farm implements pulled by such tractors.

A still further object of my invention is to provide a hitch mechanism for the connecting of a drawing vehicle with a drawn vehicle that is capable of supporting the forward end portion of the drawn vehicle at times when the two vehicles are being secured together or detached from each other.

A still further object of this invention is to provide a hitch mechanism that will automatically become highly loose and flexible when it is desired to detach the pulled vehicle from the pulling vehicle.

A still further object of my invention is to provide a hitch that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of my hitch in use.

Fig. 2 is a top plan view of my hitch with the upper plate portion broken away.

Fig. 3 is a cross sectional view of a portion of my hitch and is taken on line 3—3 of Fig. 2.

Fig. 4 is a bottom view of my hitch.

Fig. 5 is an enlarged side sectional view of the hitch latching means.

Fig. 6 is a side view of the centering yoke assembly.

Fig. 7 is a side view of the jack supporting portion and illustrates the manner in which it actuates the hitch latch mechanism.

Fig. 8 is a side view of a latch means for holding the jack standard in an elevated position when not in use.

There are many types of connecting hitches now in general use. Such hitches are quite successful if the pulling vehicle is easily maneuverable and the pulled vehicle is comparatively light in weight. However, in many situations, it is impossible for one man to connect or to disconnect the drawn vehicle to the drawing vehicle. As an illustration, it is most difficult to connect a heavy plow or like to the draw-bar of a tractor. Such connections are usually accomplished by a clevis having a pull pin. Obviously, the hole in the draw-bar of a tractor and the holes in the clevis must be in direct alignment for the insertion of the pull pin and it is most difficult to maneuver a tractor to accomplish this alignment, while at the same time properly supporting the tongue or like of the pulled vehicle. Furthermore, it is just as difficult to remove the pull pin for if there is any cramping action between the clevis portion of the tongue and the draw-bar, the pull pin is most difficult to remove. With such connections, it is obvious that there is no flexibility in the hitch proper and it is a most difficult task for even two or more men. I have overcome such objections by providing a strong hitch that may be easily and quickly rendered highly flexible for detachment and attachment purposes and on the other hand will be highly rigid in construction when in use as a connecting length between the pulling vehicle and the pulled vehicle.

Referring to the drawings, I have used the numeral 10 to designate the base plate of my hitch. This base plate 10 may be of any suitable shape or construction, but in the drawings I show it of triangular construction with its forward end extending toward the pulling vehicle. This base member 10 rests in substantially a horizontal position and has a downwardly extending rear wall 11 and two downwardly extending side walls 12 and 13. These walls 12 and 13 have their forward ends spaced apart from each other as shown in Fig. 4. The numeral 14 designates a yoke member having its two ends rotatably secured to the inner rear sides of the walls 12 and 13 respectively by bolts or like 15. This yoke 14 extends forwardly below the base 10 and has an inverted U-shaped portion 16 in its center. The numeral 17 designates a ring member rigidly secured by suitable means to the under central rear end portion of the base 10. This member 17 may also be rigidly secured to the back flange wall 11. The U-shaped portion 16 of the yoke and the ring are positioned on the longitudinal center line of the device with the portion 16 well in advance of the member 17. The central area portion of the base 10 is cut away as shown in Fig. 2. The numeral 18 designates a U-shaped member loosely extending through the ring member 17. The numeral 19 designates a bar arm having its rear end loosely extending between the two ends of the U-shaped member 18. The numeral 20 designates a bolt or like extending through the two end portions of the member 18 and through the rear end portion of the bar arm 19. The dimensions of the portion 16 of the yoke are such that the forward end portion of the U-shaped member 18 may be loosely embraced at times by the inverted U-shaped portion 16. The numeral 21 designates a U-clevis portion formed on the forward end of the arm 19. This forward end 21 of the arm 19 is designed to be secured to a draw-bar or like 22 of the pulling vehicle by a pull pin bolt or like 23 detachably extending through the portion 21 and draw bar or like. The numeral 24 designates a receiving plate bolted, riveted or otherwise secured in spaced relationship on and to the top of the base 10. In the drawings I show spacer sleeve washers 25 for holding the member 24 a slight distance above the base plate 10. The tongue, bar or like 26 of the vehicle to be pulled is secured rigidly by bolt or like to the top of the member 24. The numerals 27 designate two spaced apart rearly extending ears on the flange wall 11. The numeral 28 designates a supporting member having two spaced apart side standard portions 29. This member is pivoted to the spaced ears 27 by bolt or like 30 extending through the two ears and the two side members 29 of the support. The numeral 31 designates a cavity in the upper portion of the member 21. The numeral 32 designates a tube member on the forward upper side of the base 10. The numeral 33 designates a shaft slidably mounted in the tube 32 and capable of entering the cavity 31 when moved to a forward position and into the cavity 31 as shown in Fig. 5. The numeral 34 designates a coil spring having one end secured to said shaft 33 and its other end secured to the tube 32 for yieldingly holding the member 33 in a forward position. The numeral 35 designates a cable having its forward end secured to the rear end of the member 33 and its rear end secured to the forward upper portion of the jack support 28 as shown in Fig. 7. The numerals 36 and 37 designate two spaced apart centering walls on the forward under side of the base 10. These two members 36 and 37 extend downwardly approximately the same distance as the flange walls 12 and 13 and if desired, may be formed from such side walls. The bar arm 19 when in functioning position rests between these two members 36 and 37 and is thereby rigidly held against lateral movement.

When my device is secured to the tongue or like of a vehicle to be pulled, and it is desired to secure such vehicle to a pulling vehicle such as a tractor by the use of my hitch, it is merely necessary to lower the jack support 28 as shown in Fig. 1, thereby holding the tongue or like of the vehicle to be pulled in an elevated position. With the jack support 28 in such lowered position, the cable 35 will be moved to the rear as shown by dotted lines in Fig. 7, thereby holding the member 33 out of latch engagement with the cavity 31 of the portion 21. With this latch means rendered ineffective, the draw-bar arm 19 of the hitch may drop downwardly from between the members 36 and 37 and from between the centering U-shaped portion 16 of the yoke 14. Furthermore, with the arm 19 in such lowered position as shown in Fig. 1, it is capable of having its forward end swung either to the right or to the left as its only connection with the base portion 10 is by the ring 17 and clevis portion 18. Furthermore, the angularity of the bar arm 19 relative to the horizontal may be selectively had regardless of the position of the bar arm 19 due to the fact that the bar arm 19 is hingedly secured to the forward end portions of the U-clevis 18. Obviously, the tractor or like pulling vehicle may be backed up so that the draw-bar is within the flexible throw of the member 19 of the hitch. As we have seen, the movement of the member 19 may be accomplished in all directions and it is merely necessary to get the draw bar of the pulling vehicle in the vicinity of my hitch after which it is merely a simple matter to secure the draw bar and the member 21 of the bar arm together. As soon as the pulling vehicle is moved forward, the bar 19 will straighten out and enter the space between the members 36 and 37 and its rear end with the member 18 will move into the centering U-shaped portion 16. With both vehicles moving forwardly, the supporting jack 28 will have its lower end portion swinging to the rear and out of engagement with the ground and thereby permitting the cable 35 to move forwardly into the member 33 to enter the cavity 31 and rigidly securing the member 19 against flexible movement relative to the base 10. The members 36 and 37 will prevent the lateral movement of the member 19, the member 33, and the top of the base 10 will prevent the movement of the member 19. The forward sliding movement of the member 19 relative to the base will be prevented by the ring 17 and clevis 18. A latch means 38 may be secured on the tongue or like 26 for holding the jack support 28 in an out of the way position as shown in Fig. 8. A cable 39 may extend from this latch means to the operator of the pulling vehicle for the unlatching of the same. When it is desired to disconnect the pulled vehicle from the pulling vehicle, it is merely necessary to pull the cable 39, thereby releasing the catch mechanism 38 and permitting the support 28 to drop downwardly and engage the ground. By causing the tractor or like to move to the rear, the support 28 will automatically move to a vertical position as shown in Fig. 1, thereby slightly elevating the tongue or like 26 of the pulled vehicle. The tractor or like is then stopped and the movement of the support 28 to a vertical position will move the cable 35 to the rear, thereby unlatching the bar arm 19 from the member 33 and permitting this arm to move downwardly and be of a flexible nature. Obviously, when the device is in such a flexible condition, the portion 21 may be easily and quickly detached from the draw bar of the tractor or like. From the foregoing, it will readily be seen that I have provided a hitch for tractors or like for heavy vehicles to be pulled that may be easily actuated by the driver of the tractor or like. It will be appreciated that my hitch is particularly adapted for backing the two connected vehicles. When the latch is properly holding the portion 21 in an upright position, the portion 21 will directly engage the forward end portion of the base thereby for backing purposes. When the latch means is actuated and the vehicles are moved rearwardly to bring the support to an elevated position for raising the forward end portion of the pulled vehicle, the yoke portion will move downwardly embracing the member 18 and thereby holding the bar 19 in a straight line during this backing procedure. The only way that the member 19 can have material lateral movement is when the yoke portion is held upwardly or when the bar 19 is in an extreme lowered position.

Some changes may be made in the construction and arrangement of my improved hitch without departing from the real spirit and purpose of my invention, and it is my intention to cover by my claims any modified forms of structure or use of mechanical equivalents which may be reasonably included within their scope.

I claim:

1. In a hitch, a base member designed to be secured to a vehicle, a bar member operatively flexibly secured at one of its ends to said base member and designed to have its other end connected to a second vehicle, a latch means for securing said bar member to said base member against relative movement, a supporting member having one end hingedly secured to said base member, and an elongated member having one end secured to said latch means and its other end secured to said supporting member; said latch means, said supporting member and said elongated member being so constructed and arranged one to the other that when said supporting member moves into a vertical supporting condition said elongated member will release said latch means and permit said bar member to move relative to said base member.

2. In a hitch, a base member, a ring member operatively secured to the rear end portion of said base member, a U-shaped member extending through said ring member, a bar member having one end extending between the two ends of said U-shaped member, an elongated member extending through the two end portions of said U-shaped member and the end portion of said bar member, a yoke member having its two ends hingedly operatively secured to said base member and having a central U-shaped portion capable of loosely embracing the end portions of said U-shaped member, two guide portions on said base member designed to extend at each side of the forward end portion of said bar member for preventing at times the lateral swinging movement of said bar member, and a latch means on said base member capable of engaging the forward end portion of said bar member for preventing the vertical movement of the forward end portion of said bar member relative to said base member at times.

3. In a device of the class described, a base member designed to be operatively secured to a vehicle, a vertically positioned U-shaped member, a means for flexibly securing said U-shaped member to said base member, a bar member having one end loosely extending between the two ends of said U-shaped member and its other end designed to be operatively secured to a second vehicle, a link member flexibly secured to said base member and secured to said bar member, and a means capable of securing said bar member against vertical movement relative to said base member.

4. In a device of the class described, a base member designed to be operatively secured to a vehicle, a downwardly extending U-shaped member, a means for flexibly securing said U-shaped member to said base member, a bar member having one end loosely extending between the two ends of said U-shaped member and its other end designed to be operatively secured to a second vehicle, a link flexibly secured at one end to said base member and its other end secured to said bar member, and a means capable of preventing the lateral movement of said bar member relative to said base member at times.

5. In a device of the class described, a base member designed to be operatively secured to a vehicle, a downwardly extending U-shaped yoke member, a means for flexibly hingedly securing said U-shaped yoke member to said base member, a bar member having one end loosely extending between the two ends of said U-shaped yoke member and its other end designed to be operatively secured to a second vehicle, a member flexibly secured to said base member and flexibly secured to said bar member, and guide members on said base member for providing a receiving area for a portion of the length of said bar member at times.

OTTO F. JAGER.